PARITY DETERMINING CIRCUIT USING A TANDEM ARRANGEMENT OF HYBRID JUNCTIONS

Filed Nov. 17, 1967 3 Sheets-Sheet 1

INVENTOR
E. S. PAGE
BY
ATTORNEY

United States Patent Office 3,510,840
Patented May 5, 1970

3,510,840
PARITY DETERMINING CIRCUIT USING A TANDEM ARRANGEMENT OF HYBRID JUNCTIONS

Eugene S. Page, Elon College, N.C., assignor to Bell Telephone Laboratories, Incorporated, Murray Hill and Berkeley Heights, N.J., a corporation of New York
Filed Nov. 17, 1967, Ser. No. 683,948
Int. Cl. H03k *13/32*
U.S. Cl. 340—146.1 12 Claims

ABSTRACT OF THE DISCLOSURE

Errors may be detected in transmission systems by use of apparatus in which hybrid junctions, or the like, are utilized to sense a set of signal conditions within the system. An interrogation signal to known polarity is propagated through a tandem arrangement of junctions and the polarity of the resultant output signal is used to denote whether or not a proper set of conditions exists.

BACKGROUND OF THE INVENTION

This invention relates to the detection of errors in digital systems and, more specifically, to detection of errors by the checking of parity.

Field of the invention

During the transmission of digital signals, or the like, it is desirable that transmission errors be detected. A single error in a code combination, or binary word, may produce another code combination, or word, which is also within a particular code scheme. This type of error may be detected by use of the parity check. Parity is the forcing of the code combination to have either an even or odd number of signals representative of one binary state, for example, an even number of signals representing the high or "1" state. Then the system is checked for errors by determining whether or not a particular code combination has an even number of "1's."

Description of the prior art

Many parity checking schemes have been devised. For example, one scheme for checking parity is the logic "tree" which utilizes a plurality of Exclusive-OR gates. Signals representative of a code combination or a binary word are propagated through the Exclusive-OR gates and the resultant output signal indicates whether the code combination has an even or odd number of 1's, i.e. whether or not parity has been violated. This type system, although adequate in many applications, is unsatisfactory in others due to the large number of circuit components required and to the time required for the signals to propagate through these components.

In other schemes for checking parity, the signals or code combinations to be checked, which are simultaneously present at selected points or nodes within a system, are converted into a series progression. Signals representative of the "1" (or "0") state of the series signal are then counted and the resultant count is examined to determine whether or not parity has been violated. This type system, although usually utilizing fewer components than the logic tree, is undesirable in many applications because of the relatively long time period required in making the parity check.

SUMMARY OF THE INVENTION

Therefore, it is an object of this invention to improve parity checking circuits.

Another object of the invention is to simplify the design of a parity checking circuit.

A further object of this invention is to decrease the time interval required in checking parity.

In accordance with this invention, these and other objects are accomplished in a circuit which utilizes a plurality of controllable polarity inverting networks connected in series. The networks are selectively controlled either to invert or not-invert a signal propagating through the series connection. The inverting or non-inverting characteristic of the networks is controlled in response to signals representative of the binary characters of a code word. Thus, an error in a code word, or the like, is detected by propagating a signal of known polarity through the serial connection of networks and utilizing the polarity of the signal developed at the output of the series connection as a measure of the parity of the code word.

A typical polarity inverting device which is utilized in the practice of the invention is the hybrid junction. A hybrid junction is a device often used in high frequency power splittting applications. It exhibits a broad bandwidth and provides excellent isolation between output terminals. Due to the broad bandwidth, signals may be propagated very rapidly through the hybrid junction, that is, the time delay is minimal. Excellent isolation makes it possible either to short circuit or open circuit one output terminal of the hybrid without significantly affecting signals at a second output terminal. Conditions at selected ones of the output terminals, for example, either a short circuit or an open circuit, may be detected by applying an interrogation signal to the hybrid input terminal and observing the resultant signal at the remaining hybrid output terminal. For example, a signal propagated through a hybrid junction is phase translated and attenuated when a first output terminal of the junction is short circuited to a given reference potential point, such as circuit ground, and a second output terminal is terminated in its characteristic impedance. The signal appears at the remaining hybrid output terminal at a reduced level and inverted with respect to the input signal. Energy loss is eliminated by switching the second output terminal either to the reference potential point or to the open circuit condition, instead of terminating it with its characteristic impedance. Thus, in operation, the second output terminal is short circuited to the reference potential point when the first output terminal is open circuited, and vice versa.

According to this invention, parity may be rapidly checked in a circuit which utilizes a serial connection of hybrid junction networks or other controllable polarity inverters. At least one output terminal of each hybrid junction is selectively terminated with a given load, such as a reference potential or an open circuit. The particular termination is selected in response to signal conditions present at selected points or nodes within a transmission system or the like, which is to be checked. Accordingly, parity of signal conditions at a given number of nodes or channels is checked by propagatnig a signal of known polarity through the serially connected hybrid junction networks and observing the polarity of the resultant output signal.

These and other objects and advantages of the invention will be more fully understood from the following detailed description of illustrative embodiments thereof taken in connection with the appended drawings.

DETAILED DESCRIPTION OF THE INVENTION

Figure 1:
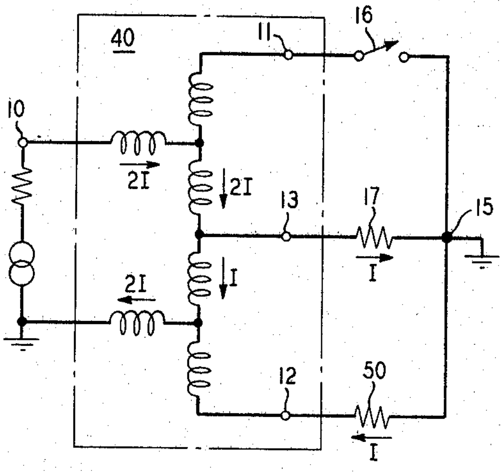
FIG. 1 is a schematic representation of a hybrid junction network which may be used in the practice of the invention.

FIG. 1 illustrates, in simplified schematic form, a hybrid junction network which may be utilized in the practice of the invention. The hybrid network employs a junction 40 having an input terminal 10 and output terminals 11, 12, and 13. Normally, each of the output terminals is terminated in its proper characteristic impedance. A signal applied to input 10 divides evenly between outputs 11 and 12, and no signal appears at output 13. In this invention, however, at least one of the output terminals, for example output 11, is either short circuited through switch 16 to reference potential point 15 or open circuited. With output 11 open circuited and a signal applied to input 10, current flow is as shown in FIG. 1. The resultant signal at output 13 is in phase with the input signal but is attenuated by approximately 6 db due to the energy lost in impedance 50. Conversely, assuming switch 16 to be closed, terminal 11 is short circuited to reference potential point 15. A signal applied to input 10 then appears at output 13 attenuated, as before, but inverted with respect to the input signal. Thus, with output 11 open circuited, the signal applied to input 10 appears at output 13 in phase with the input signal and with output 11 short circuited to point 15 the signal at output 13 is inverted with respect to the input signal.

Figure 2:
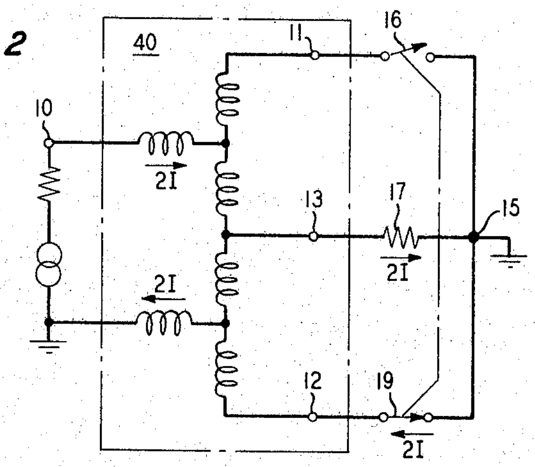
FIG. 2 is a schematic representation of a second form of hybrid junction network which may be used in the practice of the invention.

FIG. 2 shows a hybrid junction in a second circuit configuration which may be utilized in the practice of this invention. In this instance output 12 of junction 40 is additionally switched between an open circuited and short circuited condition with respect to reference potential point 15; i.e., it is not terminated with its characteristic impedance. The advantage of this circuit over that of FIG. 1 is that there is little, if any, attenuation of the signal appearing at output terminal 13. With switch 16 in the open position and switch 19 closed, as shown in FIG. 2, the signal at output 13 is in phase with an input signal. With switch 16 closed and switch 19 open circuited with respect to reference potential point 15, the signal at output 13 is inverted with respect to the input.

Hybrid junctions which may be used in the practice of this invention are discussed in "Some Broad-Band Transformers" by C. L. Ruthroff in Proceedings of the IRE, 1959 at page 1337.

Figure 3:
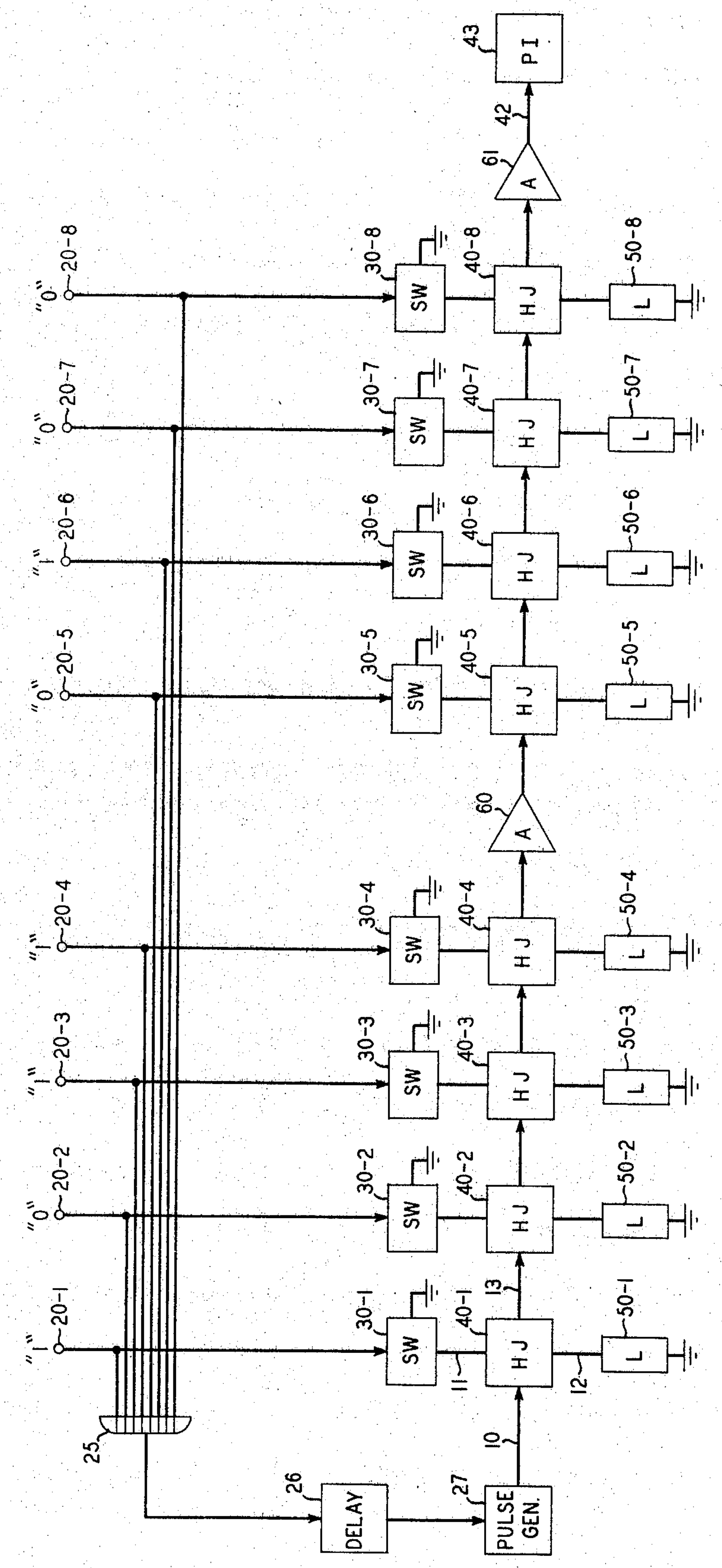
FIG. 3 is a schematic diagram of a parity checking circuit that illustrates the principles of the invention.

FIG. 3 illustrates an embodiment of a parity checking circuit which utilizes a plurality of hybrid junctions 40–1 through **40–*n***, where $n=8$. This circuit may be used in conjunction with *n* data transmission channels or nodes within a data transmission system. However, for simplicity it will be assumed that there are only eight nodes or channels to be checked. A typical binary combination to be checked may take the form 10110100. Signals representative of this combination are supplied via inputs 20–1 through 20–8 individually to switching elements 30–1 through 30–8 and collectively to OR gate 25.

Output 12 of each of hybrid junctions 40 is terminated, by one of networks 50–1 through 50–8, in its characteristic impedance.

Figure 4:
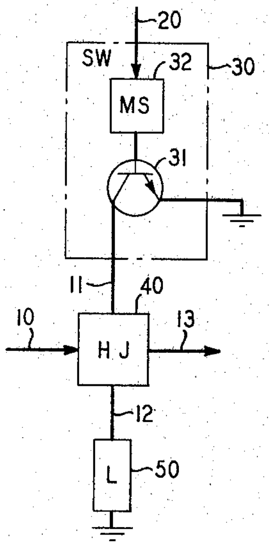
FIG. 4 shows in greater detail one element of the apparatus of FIG. 3.

Switching elements 30–1 through 30–8 are utilized in selectively switching output terminal 11 of each of hybrid junctions 40 either to a reference potential point (circuit ground) or to an open circuit condition. Switching element 30 may be of any desired form, for example, a relay or a transistor circuit as shown in FIG. 4, to be discussed later. The switching circuits are responsive to signals representative of one state of a binary signal, for example, the high or "1" state. With no signals applied, switching elements 30 present an open circuit to output terminal 11 of each of hybrid junctions 40. A signal representative of the "1" binary state applied to a switching element 30 causes terminal 11 of the connected hybrid junction 40 to be connected to circuit ground. Thus, with binary signals applied to inputs 20–1 through 20–8, as shown in FIG. 3, output terminal 11 of each of hybrids 40–1, 40–3, 40–4, and 40–6 is connected to circuit ground. Output 11 of each remaining hybrid junction 40–2, 40–5, 40–7, and 40–8, remains in the open circuited condition, since its associated switching element is supplied with signals representative of the zero ("0") binary state.

Signals representative of the individual bits of the binary word are also applied to OR gate 25. A signal on any one input lead results in a signal at the output of gate 25 which is indicative of the "1" binary state. This signal is delayed in element 26, which may be an ordinary delay line, to ensure that switching elements 30 have reacted to their respective input signals. In practice, cabling delays or the like are often enough; delay element 26 is included as a circuit convenience. The output from delay element 26 is applied to trigger pulse generator 27. Generator 27, which may be of any desired form, generates short duration pulses of a known reference polarity in response to applied signals.

A signal applied to input 10 of hybrid junction 40–1 from pulse generator 27 is thus propagated through the serial connection of hybrid junctions. Since the signal may suffer attenuation due to energy loss in terminating impedances 50, amplifiers 60 and 61 are selectively placed in the series connection to restore the propagating signal to an acceptable level.

During propagation, the interrogation pulse is affected by each of the hybrid junctions (assuming the word 10110100 to be represented by the signals at terminals 20) as follows:

| Hybrid network: | Effect on interrogating signal |
|---|---|
| 40–1 | Inverted. |
| 40–2 | None. |
| 40–3 | Inverted. |
| 40–4 | Do. |
| 40–5 | None. |
| 40–6 | Inverted. |
| 40–7 | None. |
| 40–8 | Do. |

Since the pulse is inverted an even number of times in this example, the signal at 42 is in phase with the signal applied at input 10 of the system. This indicates that the code combination meets even parity. The signal at 42 may be utilized in any number of ways to indicate the condition of parity. Preferably it is applied to polarity indicator 43 where, for example, the signals may be used to trigger an indicator light.

FIG. 4 shows in greater detail one embodiment of a switching element 30 which may be utilized in the apparatus of FIG. 3. Element 30 comprises a switching transistor 31 which is connected to one of the output terminals of hybrid junction 40, in this example, output 11. Transistor 31, which is normally in an open circuit condition, is driven on or into saturation by a signal from generator 32. Generator 32, for example, a monostable multivibrator, preferably has one stable state, and is triggered to a second state in response to a signal representative of a binary "1" applied to terminal 20. It remains in that state for a predetermined period, and holds transistor 31 ON. The second state or astable period is selected to allow the interrogating signal to be propagated through each of the serial connection of hybrid junctions. At the end of this period, the generator returns to its stable state and switching transistor 31 is again in an open circuit condition. Use of generator 32 may not be necessary in systems where input signals to terminals 20 are of a sufficient duration to switch transistor 31 or drive it into saturation during propagation of the interrogating signal through the series of hybrid junctions.

Figure 6:
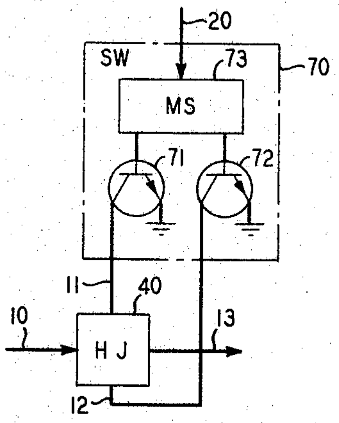
FIG. 6 shows in greater detail one of the blocks of FIG. 5.
Figure 5:
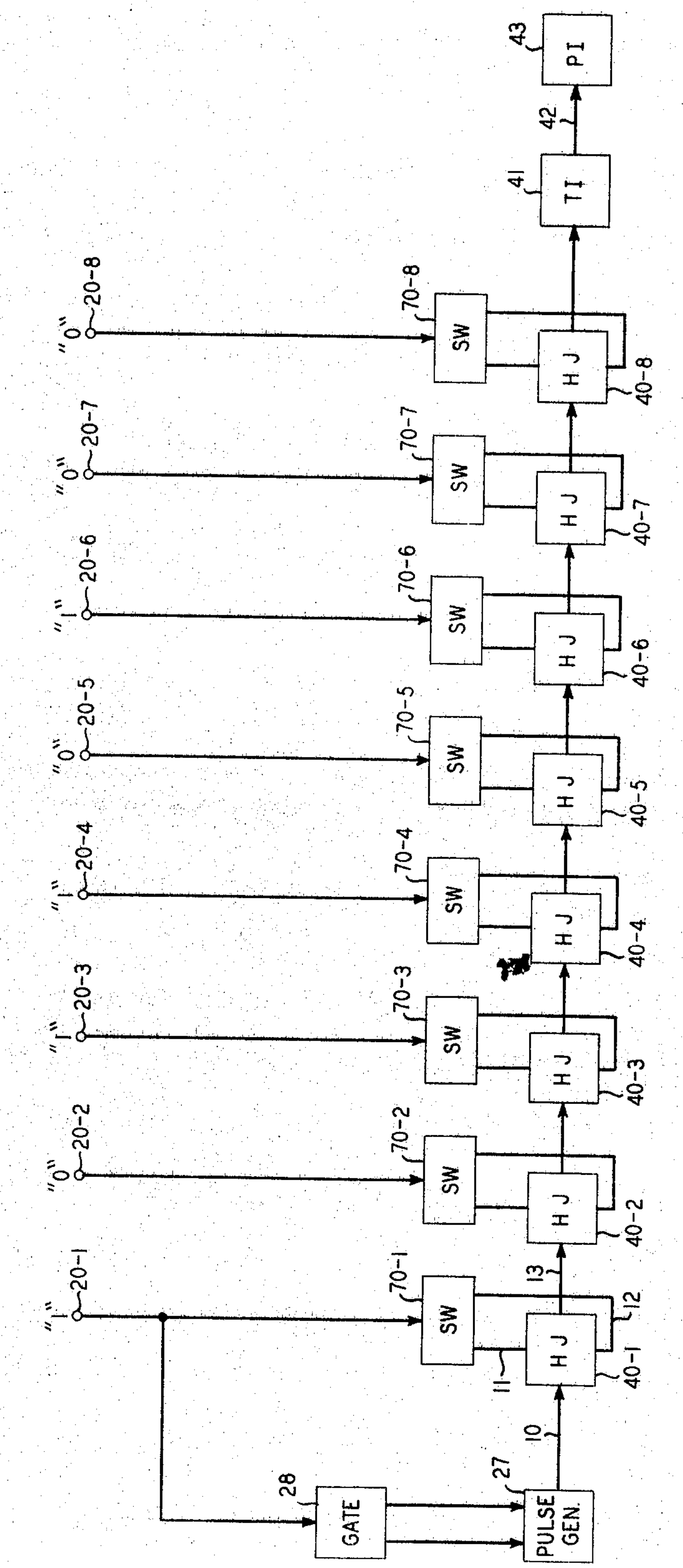
FIG. 5 shows in block schematic form a second parity checking circuit that illustrates the present invention.

An alternative circuit for checking parity which utilizes the principles of this invention is shown in FIG. 5. As previously stated, signals representative of a binary word are applied to inputs 20–1 through 20–8. These signals trigger switching elements 70–1 through 70–8, respectively, which in turn selectively switch output terminals 11 and 12 of hybrids 40–1 through 40–8 between circuit ground and an open circuit condition. Again, each of switching elements 70 may comprise a pair of relays or a pair of transistors as shown in FIG. 6. Generator 27 generates a pulse of known polarity which is propagated through the serially connected hybrid junctions 40. Propagation may be initiated in any of a number of ways. For example, in a synchronous system a clock network is utilized for generating a signal which is applied to trigger generator 27. In an asynchronous system the OR gate arrangement as shown in FIG. 3 is utilized. In certain transmission systems the respective binary states are represented by positive and negative signals. Thus, signals from a single input, 20–1 in this example, are applied to gate 28. Gate 28 may take any desired form, for example, two diodes. One diode is positioned to pass a positive signal representative of the "1" binary state and the second diode is positioned to pass a negative signal representative of the "0" binary state. The positive or negative output from gate 28 (positive in this example) is applied to trigger generator 27. The polarity of the output signal from the serial connection is determined in indicator 43. To ensure maximum signal transmission, the last hybrid junction in the series connection, viz., hybrid 40–8, is terminated in its proper characteristic impedance 41.

No signal amplifiers are necessary in this embodiment, as in the embodiment of FIG. 3, because outputs 11 and 12 are switched alternately between circuit ground and an open circuit condition, thus reducing insertion loss. That is, there is little energy lost in the hybrid network since neither output 11 nor output 12 is terminated in its characteristic impedance. The operation of this circuit in checking parity for the binary word 10110100, as shown in FIG. 5, is identical to that as previously described with respect to the system of FIG. 3.

FIG. 6 shows in greater detail an embodiment of switching element 70 which may be utilized in the apparatus of FIG. 5. Element 70 comprises switching transistors 71 and 72 which are connected to output terminals 11 and 12, respectively, of hybrid junction 40. Transistor 71, which is normally in an open circuit condition, and transistor 72, which is normally in an ON or short-circuit condition, are each driven by signals from generator 73. Generator 73 may be of any variety having one stable state and capable of being triggered to a second state in response to a signal applied to terminal 20. A monostable multivibrator is satisfactory. When a signal representing the "1" binary state is applied to terminal 20, generator 73 is triggered into a second state for a predetermined period, and transistor 71 is driven ON. Transistor 72 is consequently cut off. The period is set at a value to allow propagation of an interrogating pulse through each of a serial connection of hybrid junctions 40. At the end of this period, generator 73 returns to its stable state and switching transistors 71 and 72 return to their original conditions.

The above-described arrangements are, of course, merely illustrative of the application of the principles of this invention. Numerous other arrangements may be devised by those skilled in the art without departing from the spirit and scope of the invention. For example, by using relays or analog switching devices, an operational amplifier can be operated either as an inverting or as a non-inverting signal transmission network.

What is claimed is:

1. The method of checking parity of a code word of binary characters which comprises the steps of:
- selectively adjusting the transmission characteristic of each of the plurality of serially connected inverter networks in accordance with the respective binary state of each character of said code word;
- propagating a signal having a known initial state through said serially connected networks;
- comparing the signal developed at the output of said serial connection of networks with the initial state of said propagating signal; and
- utilizing said comparison as an indication of the parity of said code word.

2. Apparatus for checking the parity of a code word of binary characters which comprises:
- a plurality of controllable signal transmission networks;
- a plurality of means each respectively responsive to a lected code word character for controlling the transmission properties of said networks;
- means for establishing a serial transmission path through all of said transmission networks;
- means for transmitting a signal having a preestablished initial state through said serial connection of networks; and
- means for comparing the signal developed at the output of said series connection of networks with the initial state of said transmitted signal, said comparison being an indication of the parity of said code word.

3. Apparatus for checking the parity of a code word composed of individual binary characters, which comprises:
- a plurality of controllable signal inverting networks for selectively inverting a signal propagating therethrough;
- means for connecting said networks in series;
- a plurality of means each respectively associated with one of said networks for controlling the inversion property of said associated network, each of said means being respectively responsive to a selected code word character;
- a source of a signal having a predetermined initial state;
- means for transmitting said signal through said serial connection of networks; and
- means for comparing the signal developed at the output of said series connection of networks with the initial state of said transmitted signal, said comparison being an indication of the parity of said code word.

4. The apparatus as defined in claim 3 wherein said inverting networks each comprise a hybrid junction network equipped with an input terminal and at least first and second output terminals; and
- wherein said series connection is formed by way of said input terminal and said first output terminal of each of said networks.

5. The apparatus as defined in claim 4 wherein said associated means comprises:
- a switching element for respectively terminating said second output terminal of each of said hybrid junction networks thereby establishing a selected transmission property therein.

6. The apparatus as defined in claim 5 wherein said switching element is a relay.

7. The apparatus as defined in claim 5 wherein said switching element is a transistor.

8. The apparatus as defined in claim 5 further including at least one amplifier selectively inserted in said series connection of networks for restoring said propagating signal to a preestablished level.

9. The apparatus as defined in claim 7 further including a monostable multivibrator selectively responsive to said code word character for generating potentials for controlling said transistor.

10. Apparatus for determining the parity of a code word of binary characters which comprises in combination:

a plurality of hybrid junction networks each equipped with an input terminal and at least first, second and third output terminals;

means for interconnecting said networks to form a series circuit by way of said input terminal and said first output terminal of each of said networks;

a first plurality of switching elements each of which is respectively associated with one of said hybrid junction networks for selectively terminating said second output terminal with a preselected load to establish a selected transmission characteristic, each of said elements being respectively responsive to a selected code word character;

a second plurality of switching elements each of which is respectively associated with one of said hybrid junction networks for selectively terminating said third output terminal with a preselected load to establish a selected transmission characteristic, each of said elements being respectively responsive to a selected code word character;

means for generating a pulsing signal having a predetermined reference polarity;

means for propagating said pulsing signal through said series of networks; and means for utilizing the polarity of the signal developed at the output of said series circuit as an indication of the parity of said code word.

11. The apparatus as defined in claim 9 wherein said first and second switching elements each comprises a transistor.

12. The apparatus as defined in claim 10 further including a monostable multivibrator responsive to said code character for generating potentials for controlling said transistors.

References Cited

UNITED STATES PATENTS

| | | | |
|---|---|---|---|
| 3,250,900 | 5/1966 | Diamant | 340—146.1 X |
| 3,309,666 | 3/1967 | Frohman | 340—146.1 |
| 3,439,328 | 4/1969 | Winder | 340—146.1 |

EUGENE G. BOTZ, Primary Examiner

R. S. DILDINE, Jr., Assistant Examiner

U.S. Cl. X.R.

235—153; 307—236, 262